(12) United States Patent
Gao et al.

(10) Patent No.: US 10,447,593 B2
(45) Date of Patent: Oct. 15, 2019

(54) METHOD AND GATEWAY FOR OBTAINING ROUTE ACCORDING TO REQUIREMENT

(71) Applicant: HUAWEI TECHNOLOGIES CO., LTD., Shenzhen, Guangdong (CN)

(72) Inventors: Yuan Gao, Nanjing (CN); Xinpeng Li, Nanjing (CN); Yongli Yuan, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/910,546

(22) Filed: Mar. 2, 2018

(65) Prior Publication Data

US 2018/0198712 A1    Jul. 12, 2018

Related U.S. Application Data

(63) Continuation of application No. PCT/CN2016/111938, filed on Dec. 24, 2016.

(30) Foreign Application Priority Data

Jan. 18, 2016  (CN) .......................... 2016 1 0031655

(51) Int. Cl.
*H04L 12/741* (2013.01)
*H04L 12/66* (2006.01)
(Continued)

(52) U.S. Cl.
CPC ............ *H04L 45/745* (2013.01); *H04L 12/66* (2013.01); *H04L 45/24* (2013.01); *H04L 61/103* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 10,187,302 B2 * | 1/2019 | Chu | ........................ H04L 45/22 |
| 2005/0185645 A1 | 8/2005 | Seppanen | |

(Continued)

FOREIGN PATENT DOCUMENTS

| | | |
|---|---|---|
| CN | 101330447 | 12/2008 |
| CN | 102857427 | 1/2013 |

(Continued)

OTHER PUBLICATIONS

Extended European Search Report dated Jul. 27, 2018 in corresponding European Patent Application No. 16886145.8.
(Continued)

*Primary Examiner* — Mewale A Ambaye
(74) *Attorney, Agent, or Firm* — Conley Rose, P.C.

(57) ABSTRACT

A method and gateway obtain a route according to a requirement. The method includes: a first gateway receives a first packet; the first gateway searches a forwarding table for a next hop of a first IP address in the first packet, wherein the search fails; the first gateway sends a second packet carrying the first IP address to at least one gateway; the first gateway receives a third packet from a second gateway; and the first gateway writes an address of the second gateway into the forwarding table as a next hop address of the first IP address.

15 Claims, 3 Drawing Sheets

(51) Int. Cl.
*H04L 29/12* (2006.01)
*H04L 12/707* (2013.01)

(52) U.S. Cl.
CPC ...... *H04L 61/2007* (2013.01); *H04L 61/6022* (2013.01)

(56) References Cited

U.S. PATENT DOCUMENTS

| | | | | |
|---|---|---|---|---|
| 2014/0092907 | A1* | 4/2014 | Sridhar | H04L 45/74 370/392 |
| 2014/0372582 | A1* | 12/2014 | Ghanwani | H04L 45/64 709/223 |
| 2015/0124586 | A1* | 5/2015 | Pani | H04L 12/18 370/219 |
| 2015/0236952 | A1 | 8/2015 | Liang et al. | |
| 2015/0281075 | A1* | 10/2015 | Park | H04L 45/745 370/392 |
| 2015/0312137 | A1 | 10/2015 | Li et al. | |
| 2017/0026273 | A1* | 1/2017 | Yao | H04L 45/02 |
| 2017/0170989 | A1 | 6/2017 | Sridhar et al. | |

FOREIGN PATENT DOCUMENTS

| | | |
|---|---|---|
| CN | 104283980 A | 1/2015 |
| CN | 104702476 | 6/2015 |
| EP | 2966815 A1 | 1/2016 |
| JP | 2005244983 A | 9/2005 |
| JP | 2005244983 A | 9/2015 |
| JP | 2015531212 A | 10/2015 |
| JP | 2015534388 A | 11/2015 |
| WO | 2016054974 A1 | 4/2016 |

OTHER PUBLICATIONS

International Search Report, dated Mar. 22, 2017, in International Application No. PCT/CN2016/111938 (6 pp.).
Written Opinion of the International Searching Authority, dated Mar. 22, 2017, in International Application No. PCT/CN2016/111938 (7 pp.).
Japanese Office Action dated Feb. 4, 2019 in related Japanese Patent Application No. 2018-526292 (2 pages) (3 pages English Translation).
Extended European Search Report dated Jul. 27, 2018 in corresponding European Patent Application No. 16886145.8, 9 pages.

* cited by examiner

METHOD AND GATEWAY FOR OBTAINING ROUTE ACCORDING TO REQUIREMENT

CROSS-REFERENCE TO RELATED APPLICATIONS

This application is a continuation of International Application No. PCT/CN2016/111938, filed on Dec. 24, 2016, which claims priority to Chinese Patent Application No. 201610031655.4, filed on Jan. 18, 2016. The disclosures of the aforementioned applications are hereby incorporated by reference in their entireties.

TECHNICAL FIELD

The present disclosure relates to the communications field, and in particular, to a method and gateway for obtaining a route according to a requirement.

BACKGROUND

In a network architecture of a distributed gateway, a local area network (English: local area network, LAN for short) includes multiple gateways. When a host changes its gateway, a Media Access Control (English: Media Access Control, MAC for short) address and an Internet Protocol (English: Internet Protocol, IP for short) address of the host are not changed. A packet forwarding manner in the distributed gateway architecture is that, regardless of whether a host sending a packet and a host receiving the packet are located in a same broadcast domain (English: broadcast domain, BD for short), the sender host sends the packet to a gateway of the sender host, and the gateway sends the packet to the receiver host according to a destination IP address of the packet. The receiver host may access a network by using another gateway in the local area network. Therefore, a forwarding table of the gateway of the sender host needs to include host routes of all hosts that access a network by using another gateway in the local area network. When the local area network includes a large quantity of hosts, a large quantity of host routes occupy many storage resources of the forwarding table.

SUMMARY

This application provides a method and an apparatus for obtaining a route according to a requirement, to obtain a route according to an actual packet forwarding requirement in a network architecture of a distributed gateway, thereby saving storage resources of a forwarding table.

According to a first aspect, a method for obtaining a route according to a requirement is provided, including:
  receiving, by a first gateway, a first packet, where the first packet includes a first Internet Protocol IP address;
  searching, by the first gateway, a forwarding table for a next hop of the first IP address, wherein the search fails;
  sending, by the first gateway, a second packet to at least one gateway, where the second packet carries the first IP address, and the second packet is used to instruct a gateway receiving the second packet to determine whether a host identified by the first IP address accesses a network by using the gateway receiving the second packet;
  receiving, by the first gateway, a third packet from a second gateway, where the second gateway is one of the at least one gateway, and the third packet is used to instruct the host identified by the first IP address to access the network by using the second gateway; and
  writing, by the first gateway, an address of the second gateway into the forwarding table as a next hop address of the first IP address.

The first gateway does not need to prestore the next hop of the IP address in the first packet, but may obtain the route according to a requirement according to the accessing host. Therefore, if a network includes a large quantity of hosts, the first gateway does not need to store a next hop of an IP address of a host that has no requirement for communicating with the first gateway, thereby saving storage resources of the forwarding table.

Optionally, the second packet further carries a first virtual extensible local area network VXLAN network identifier VNI of the first packet. Before the sending, by the first gateway, a second packet to at least one gateway, the method further includes: determining, by the first gateway, the first VNI of the first packet.

For example, the determining, by the first gateway, the first VNI specifically includes: determining, by the first gateway, a port receiving the first packet; and determining, by the first gateway, the first VNI according to a mapping from the port to the first VNI. Before the first gateway searches the forwarding table for the next hop of the IP address in the first packet, the method further includes: determining, by the first gateway, the forwarding table according to a mapping from the first VNI to the forwarding table.

Optionally, the method further includes: receiving, by the first gateway, a fourth packet from a third gateway, where the fourth packet carries a second IP address; determining, by the first gateway, that a MAC address of a host identified by the second IP address can be obtained; and sending, by the first gateway, a fifth packet to the third gateway, where the fifth packet is used to instruct the host identified by the second IP address to access the network by using the first gateway. Optionally, the fourth packet further carries a second VNI, and the determining, by the first gateway, that a MAC address of a host identified by the second IP address can be obtained includes: attempting, by the first gateway, to obtain the MAC address of the host identified by the second IP address in a VXLAN segment identified by the second VNI.

Optionally, before the sending, by the first gateway, a second packet to at least one gateway, the method further includes: determining, by the first gateway according to a mapping table from multiple VNIs to multiple gateways, the at least one gateway corresponding to the VNI.

Optionally, the first packet is a data packet, the first IP address is a destination IP address of the first packet, the method further includes: performing, by the first gateway, VXLAN encapsulation on the first packet to obtain a sixth packet; and sending, by the first gateway, the sixth packet, where a value of a VNI field in a VXLAN header of the sixth packet is the VNI, and a destination IP address of an outer IP header of the sixth packet is the IP address of the second gateway.

According to a second aspect, a network device is provided, including:
  a processor, a memory, and a network interface, where the memory is configured to store a forwarding table, and the processor is configured to: receive a first packet by using the network interface, where the first packet includes a first Internet Protocol IP address;
  search the forwarding table stored in the memory for a next hop of the first IP address, wherein the search fails;

send a second packet to at least one gateway by using the network interface, where the second packet carries the first IP address, and the second packet is used to instruct a gateway receiving the second packet to determine whether a host identified by the first IP address accesses a network by using the gateway receiving the second packet;

receive a third packet from a first gateway by using the network interface, where the first gateway is one of the at least one gateway, and the third packet is used to instruct the host identified by the first IP address to access the network by using the first gateway; and write an address of the first gateway into the forwarding table stored in the memory as a next hop address of the first IP address.

A technical effect of this aspect is the same as that of the first aspect.

Optionally, the second packet further carries a first virtual extensible local area network VXLAN network identifier VNI of the first packet, and the processor is further configured to determine the first VNI of the first packet before sending the second packet to the at least one gateway.

Optionally, the processor is further configured to: receive a fourth packet from a second gateway by using the network interface, where the fourth packet carries a second IP address; determine that a MAC address of a host identified by the second IP address can be obtained; and send a fifth packet to the second gateway by using the network interface, where the fifth packet is used to instruct the host identified by the second IP address to access the network by using the first gateway.

Optionally, the fourth packet further carries a second VNI, and the determining that a MAC address of a host identified by the second IP address can be obtained specifically includes:

attempting to obtain the MAC address of the host identified by the second IP address in a VXLAN segment identified by the second VNI.

According to a third aspect, a first gateway for obtaining a route according to a requirement is provided, including a first receiving unit, a storage unit, a searching unit, a sending unit, a second receiving unit, and a processing unit, where the first receiving unit is configured to receive a first packet, where the first packet includes a first Internet Protocol IP address;

the storage unit is configured to store a forwarding table;

the searching unit is configured to search the forwarding table stored in the storage unit for a next hop of the first IP address;

the sending unit is configured to: after the searching unit searches the forwarding table stored in the storage unit for the next hop of the first IP address, wherein the search fails, send a second packet to at least one gateway, where the second packet carries the first IP address, and the second packet is used to instruct a gateway receiving the second packet to determine whether a host identified by the first IP address accesses a network by using the gateway receiving the second packet;

the second receiving unit is configured to receive a third packet from a second gateway, where the second gateway is one of the at least one gateway, and the third packet is used to instruct the host identified by the first IP address to access the network by using the second gateway; and the processing unit is configured to: obtain the third packet received by the second receiving unit, and write, as a next hop address of the first IP address according to the third packet, an address of the second gateway into the forwarding table stored in the storage unit.

A technical effect of this aspect is the same as that of the first aspect.

Optionally, the second packet further carries a first virtual extensible local area network VXLAN network identifier VNI of the first packet, and the searching unit is further configured to determine the first VNI of the first packet before the sending unit sends the second packet to the at least one gateway.

Optionally, the second receiving unit is further configured to receive a fourth packet from a third gateway, where the fourth packet carries a second IP address; the searching unit is further configured to: obtain the fourth packet received by the second receiving unit, and determine that a MAC address of a host identified by the second IP address carried in the fourth packet can be obtained; and the sending unit is further configured to send a fifth packet to the third gateway, where the fifth packet is used to instruct the host identified by the second IP address to access the network by using the first gateway.

Optionally, the fourth packet further carries a second VNI, and that the searching unit is configured to determine that a MAC address of a host identified by the second IP address can be obtained specifically configured to attempt to obtain the MAC address of the host identified by the second IP address in a VXLAN segment identified by the second VNI.

According to a fourth aspect, a computer storage medium is provided. The computer storage medium is configured to store computer software instructions used by the foregoing first gateway, and the instructions include a program designed to perform the foregoing aspects.

Optionally, based on any one of the first aspect, the second aspect, the third aspect, or the fourth aspect, the first packet is an Address Resolution Protocol ARP packet, and the first IP address is a target IP address of the first packet; or the first packet is a Neighbor Discovery Protocol NDP packet, and the first IP address is a target address of the first packet.

When the first gateway receives the ARP packet or the NDP packet, it means that a host sending the first packet may be about to communicate with the host identified by the first IP address. The first gateway sends, to another gateway when receiving the first packet, a next hop used to obtain the first IP address. In this way, a next hop of an IP address of a host having a communication requirement can be obtained early when no IP address of a host having no communication requirement is stored, thereby increasing efficiency of subsequent packet forwarding.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show some embodiments of this application, and a person of ordinary skill in the art may still derive other drawings from these accompanying drawings without creative efforts.

DESCRIPTION OF EMBODIMENTS

An application scenario described in an embodiment of this application is to describe the technical solutions of the embodiments of this application more clearly, but does not constitute limitation to the technical solutions of the embodiments of this application. A person of ordinary skill in the art will appreciate that, as a network architecture evolves and a new business scenario emerges, the technical solutions provided in the embodiments of this application are also applicable to similar technical problems.

Figure 1:
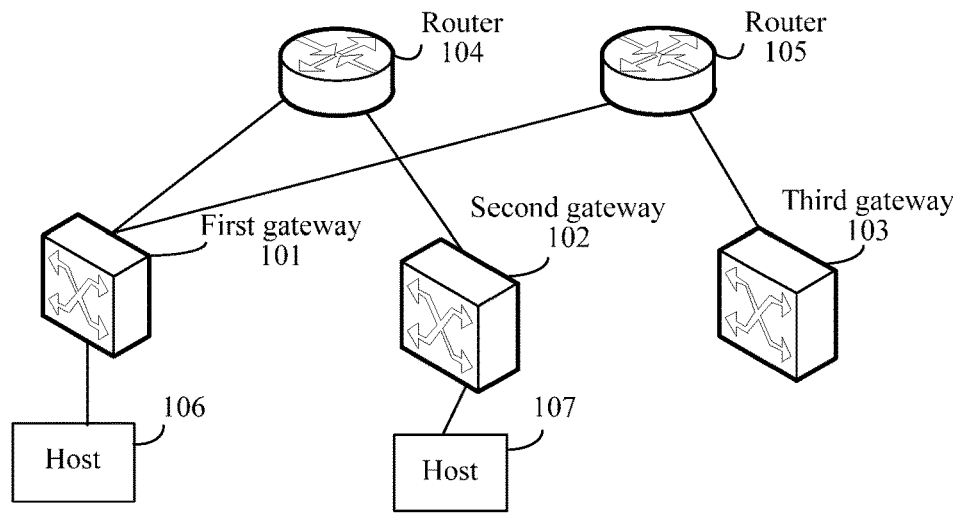
FIG. 1 is a schematic diagram of an application scenario according to an embodiment of this application.

FIG. 1 is a schematic diagram of an application scenario according to an embodiment of this application. A data center network (English: data center network, DCN for short) includes a first gateway 101, a second gateway 102, and a third gateway 103.

A host 106 may access the DCN by using any one of the first gateway 101, the second gateway 102, or the third gateway 103. Similarly, a host 107 may access the DCN by using any one of the first gateway 101, the second gateway 102, or the third gateway 103. For example, the host may be a personal computer (English: personal computer), a cell phone (English: cellphone), a smartphone (English: smartphone), a tablet computer (English: tablet computer), a wearable device (English: wearable device), a personal digital assistant (English: personal digital assistant, PDA for short), a mobile Internet device (English: mobile Internet device, MID for short), an e-book reader (English: e-book reader), or the like, or may be a virtual machine (English: virtual machine, VM for short). When the host is a virtual machine, the virtual machine can run on a server.

When a host, for example, the host 106, accesses the DCN by using different gateways, neither a MAC address nor an IP address of the host 106 is changed. For example, the host 106 is a virtual machine. When the virtual machine migrates from a server connected to the first gateway 101 to a server connected to the second gateway 102, neither a MAC address nor an IP address of the virtual machine is changed. Therefore, hosts located in a same broadcast domain (English: broadcast domain, BD for short) may access a network by using different gateways.

To reduce a quantity of broadcast packets, a packet forwarding manner in the foregoing network architecture of the distributed gateway is that: In a process in which the host 106 sends the packet to the host 107, regardless of whether the host 106 and the host 107 are in a same broadcast domain, the host 106 uses a MAC address of a gateway of the host 106 as a MAC address of the packet sent to the host 107. For example, when accessing the DCN by using the first gateway 101, the host 106 sends a packet to the first gateway 101. After receiving the packet, the first gateway 101 obtains a destination IP address in the packet by peeling off an Ethernet frame header (English: Ethernet frame header) of the packet, and forwards the packet according to the destination IP address in the packet.

When the foregoing packet forwarding manner is used, to enable the host 106 to send a packet to the host 107, the first gateway 101 connected to the host 106 needs to prestore a host route (English: host route) of the host 107 in a forwarding table. The host route includes an IP address of the host 107 and a next hop (English: next hop) of the IP address of the host 107. That is, the first gateway 101 needs to prestore a gateway that is currently used by the host 107 to access the network. For example, in FIG. 1, the first gateway 101 needs to know whether the host 107 currently accesses the network by using the second gateway 102 or by using the third gateway 103.

Therefore, when the host 107 accesses the network by using the second gateway 102, the second gateway 102 needs to advertise (English: advertise) the host route of the host 107 to another gateway in the DCN. For example, the host route is advertised to the first gateway 101 and the third gateway 103, and the first gateway 101 and the third gateway 103 store the next hop of the IP address of the host 107 as the second gateway 102.

The process of forwarding the packet and advertising the host route is described below by using an example in which the first gateway 101, the second gateway 102, and the third gateway 103 forward a data packet by using a virtual extensible local area network (English: Virtual eXtensible Local Area Network, VXLAN for short) tunnel, and advertise the host route by using the Border Gateway Protocol (English: Border Gateway Protocol, BGP for short).

The first gateway 101, the second gateway 102, and the third gateway 103 establish connections between each other in advance by using the Border Gateway Protocol (English: Border Gateway Protocol, BGP for short). That is, every two of the first gateway 101, the second gateway 102, and the third gateway 103 are BGP peers (English: BGP peer) of each other.

When the host 107 establishes a connection to the second gateway 102, the second gateway 102 advertises the host route of the host 107 to other gateways, such as the first gateway 101 and the third gateway 103, in the DCN by using a BGP packet. The first gateway 101 saves the host route of the host 107 in a routing table, and uses the second gateway 102 as the next hop of the host 107.

The first gateway 101, the second gateway 102, and the third gateway 103 are all VXLAN tunnel end points (English: VXLAN Tunnel End Point, VTEP for short).

If the host 106 and the host 107 belong to different broadcast domains, and the host 106 intends to send a data packet to the host 107, the host 106 uses the IP address of the host 107 as a destination IP address of the data packet, uses a MAC address of the first gateway as a destination MAC address of the data packet, and sends the data packet to the first gateway 101.

If the host 106 and the host 107 belong to a same broadcast domain, the host 106 intends to use a MAC address of the host 107 as a destination MAC address of the data packet. Therefore, before sending the data packet, the host 106 first broadcasts a second packet that is used to request the MAC address of the host 107 in the broadcast domain. For example, the second packet may be an Address Resolution Protocol (English: address resolution protocol, ARP for short) request packet in the Internet Protocol version 4 (English: Internet Protocol version 4, IPv4 for short). For example, in the Internet Protocol version 6 (English: Internet Protocol version 6, IPv6 for short), the second packet may be a Neighbor Discovery Protocol (English: Neighbor Discovery Protocol, NDP for short) packet in the Internet Control Message Protocol (English: Internet Control Message Protocol, ICMP for short). After the first gateway 101 receives the second packet, the first gateway 101 sends a reply packet of the second packet to the host 106 by using a proxy (English: proxy) mechanism, to inform the host 106 that the MAC address corresponding to the IP address of the host 107 is the MAC address of the first gateway 101. The host 106 uses the MAC address of the first gateway 101 as a MAC address of a first packet, and sends the first packet to the first gateway 101.

Therefore, regardless of whether the host 106 and the host 107 belong to a same broadcast domain, when sending a data packet to the host 107, the host 106 uses the MAC address of the first gateway 101 as a MAC address of the data packet. After receiving the data packet, the first gateway 101 determines, according to a port receiving the data packet, a VXLAN network identifier (English: VXLAN Network Identifier, VNI for short) of the data packet. The VNI may also be referred to as a VXLAN segment identifier (English: VXLAN Segment ID). A correspondence between each of multiple VNIs and the forwarding table is stored in the first gateway 101. The first gateway 101 determines the forwarding table according to a VNI of the first packet. The host route of the host 107 that is advertised by the second gateway 102 by using the BGP protocol is prestored in the forwarding table. The host route includes the address of the host 107, and that a next hop corresponding to the address of the host 107 is the second gateway 102. The first gateway 101 sends the data packet to the second gateway 102 by using the VXLAN tunnel. That is, the first gateway 101 performs VXLAN encapsulation on the data packet. Specifically, the first gateway 101 encapsulates a VXLAN header (English: VXLAN header), an outer User Datagram Protocol (English: User Datagram Protocol, UDP for short) header (English: outer UDP header), and an outer IP header (English: outer IP header) in order at outer layer of the data packet. A VNI in the VXLAN header is the VNI of the data packet, and a destination IP address in the outer IP header is an IP address of the second gateway 102. Refer to the Request for Comments (English: Request for Comments, RFC for short) 7348 protocol for encapsulation of other fields.

After receiving the data packet on which the VXLAN encapsulation is performed, the second gateway 102 determines the forwarding table according to the VNI in the VXLAN header of the packet. A correspondence between the IP address and the MAC address of the host in the VXLAN segment is stored in the forwarding table. The second gateway 102 finds the MAC address of the host 107 in the forwarding table, and sends the data packet to the host 107.

In the solution, the first gateway 101 needs to prestore, in the forwarding table, all host routes accessing the network by using another gateway. When the DCN includes a large quantity of hosts, there are a huge quantity of host routes. Because some hosts may have no requirement for communicating with each other, the some host routes may not be desired by the first gateway 101. Storing a host route not desired by the first gateway 101 occupies a storage resource of the forwarding table.

Embodiments of this application provide a method for obtaining a route according to a requirement. The method is used to obtain a route in a network architecture of a distributed gateway according to an actual packet forwarding demand, thereby saving storage resources of a forwarding table.

Figure 2:
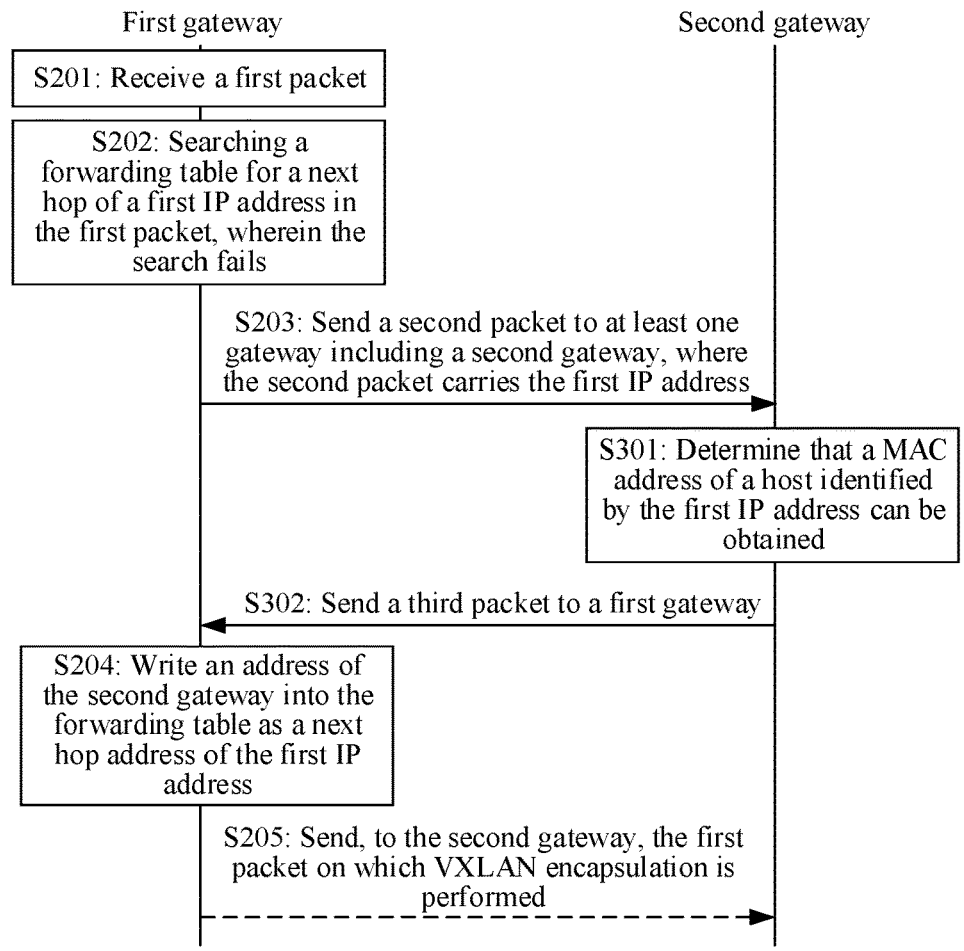
FIG. 2 is a flowchart of a method for obtaining a route according to a requirement according to an embodiment of this application.

FIG. 2 shows a method for obtaining a route according to a requirement according to an embodiment of this application. For example, the method may be applied to the distributed gateways shown in FIG. 1. A first gateway in the method shown in FIG. 2 may be the first gateway 101 shown in FIG. 1. A second gateway in the method shown in FIG. 2 may be the second gateway 102 shown in FIG. 1. The method includes the following steps.

S201: The first gateway receives a first packet, where the first packet includes a first IP address.

A host identified by the first IP address is not a sender of the first packet. For example, the first packet is from a first the host, but the host identified by the first IP address is a second host.

For example, the first packet is the packet that is sent by the host 106 to the first gateway 101 shown in FIG. 1.

In a possible example, the first packet is a data packet. The first IP address is a destination IP address (English: destination IP address) in the first packet. For example, the first packet is a data packet to be sent by the host 106 to the host 107. The destination IP address is an IP address of the host 107.

In another possible example, the first packet is an ARP packet, and the first IP address is a target protocol address (English: target protocol address, TPA for short) of the first packet. For example, the host 106 intends to send the data packet to the host 107 according to IPv4, and the host 106 and the host 107 belong to a same broadcast domain. Before sending the data packet to the host 107, the host 106 first broadcasts the ARP packet, to obtain a MAC address of the host 107.

In still another possible example, the first packet is an NDP packet, and the first IP address is a target address (English: target address) of the first packet. For example, the host 106 intends to send the data packet to the host 107 according to IPv6, and the host 106 and the host 107 belong to a same broadcast domain. Before sending the data packet to the host 107, the host 106 first sends the NDP packet (for example, neighbor solicitation (English: Neighbor Solicitation)), to obtain a MAC address of the host 107.

S202: The first gateway searches a forwarding table for a next hop of the first IP address, wherein the search fails.

In this application, multiple IP addresses and a next hop of each of the multiple IP addresses are stored in the forwarding table. For example, when a host accesses a network by using another gateway (for example, the second gateway), the next hops of the IP addresses stored in the forwarding table may include an IP address of the gateway (for example, the second gateway). That is, a mapping from an IP address of the host to the IP address of the gateway (for example, the second gateway) is stored in the forwarding table. For example, when a host accesses a network by using a gateway (for example, the first gateway) that stores the forwarding table, the next hops of the IP addresses stored in the forwarding table may include a MAC address of the host. That is, a mapping from an IP address of the host to the MAC address of the host is stored in the forwarding table. Further, outbound interface identifiers of the next hops of the IP addresses may further be stored in the forwarding table.

For example, the forwarding table may be a routing information base (English: routing information base, RIB for short) or a forwarding information base (English: forwarding information base, short FIB for).

Optionally, between S201 and S202, the first gateway may further perform the following step: the first gateway determines a first VNI of the first packet.

For example, the first gateway determines a port receiving the first packet; the first gateway determines, according to a mapping between the port and a virtual extensible local area network VXLAN network identifier VNI, the VNI of the first packet; and the first gateway determines the forwarding table of the VNI according to the VNI.

Specifically, hosts in VXLAN segments identified by different VNIs cannot communicate with each other. The first gateway stores multiple forwarding tables and a mapping from each VNI to the forwarding tables. For example, each forwarding table is a virtual routing and forwarding (English: virtual routing and forwarding, VRF for short) instance (English: instance).

That the first gateway searches a forwarding table for a next hop of the first IP address, wherein the search fails, means that the first gateway does not find, in the forwarding table, the next hop of the IP address in the first packet.

S203: The first gateway sends a second packet to at least one gateway, where the second packet carries the first IP address, and the second packet is used to instruct a gateway receiving the second packet to determine whether a host identified by the first IP address accesses a network by using the gateway receiving the second packet.

In a possible example, the first gateway may search a mapping table from multiple VNIs to multiple gateways for a gateway having the VNI of the first packet. In the mapping table, a mapping from the VNI of the first packet to the at least one gateway is stored. The at least one gateway is a gateway to which a host identified by the VNI is allowed to connect in a local area network. The first gateway determines, according to a result of the searching, the at least one gateway having the VNI of the first packet.

In another possible example, the first gateway sends the second packet to all gateways in the local area network.

For example, the first gateway and the at least one gateway may be the BGP peers in FIG. 1. The second packet may be a BGP packet. Further, the second packet may be an update (English: update) packet defined in BGP. The first IP address may be carried in a path attribute (English: Path Attribute) field in the update packet. Specifically, a type is defined in type-length-value (English: Type-Length-Value, TLV for short) of the path attribute field, to identify the second packet. The first IP address is carried in a value field.

Optionally, the second packet further carries the VNI of the first packet. For example, the VNI of the first packet and the first IP address are both carried in the path attribute field in the update packet.

Optionally, the second packet further carries a broadcast domain identifier of the first IP address. For example, the first gateway stores a correspondence between multiple IP subnet segments and broadcast domains. The first gateway obtains the broadcast domain identifier according to a broadcast domain corresponding to the first IP address. For example, the broadcast domain identifier, the VNI of the first packet, and the first IP address are all carried in the path attribute field in the update packet.

S301: The second gateway receives the second packet from the first gateway, and the second gateway determines that a MAC address of the host identified by the first IP address carried in the second packet can be obtained.

Optionally, if the second packet further carries the VNI of the first packet, that the second gateway determines that a MAC address of the host identified by the first IP address carried in the second packet can be obtained specifically includes: determining, by the second gateway in a VXLAN segment corresponding to the VNI, that the MAC address of the host identified by the first IP address can be obtained.

For example, that the second gateway obtains the MAC address of the host identified by the first IP address carried in the second packet may include: searching, by the second gateway, multiple stored mapping tables between IP addresses and MAC addresses for a MAC address corresponding to the first IP address. For example, the host identified by the first IP address is the host 107, and the MAC address that corresponds to the first IP address and that is stored in the mapping table is the MAC address of the host 107. When establishing a connection to the second gateway, the host 107 sends the MAC address of the host 107 to the second gateway. The second gateway saves a correspondence between the MAC address of the host 107 and the IP address into the multiple mapping tables between the IP addresses and the MAC addresses. If the second packet further carries the VNI of the first packet, the second gateway further stores a correspondence between the VNI and the multiple mapping tables between the IP addresses and the MAC addresses. In the multiple mapping tables between the IP addresses and the MAC addresses, mappings between IP addresses and MAC addresses in the VXLAN segment corresponding to the VNI are stored.

For example, that the second gateway determines that a MAC address of the host identified by the first IP address carried in the second packet can be obtained may further include: broadcasting, by the second gateway, a request packet to a host accessing the network by using the second gateway. The request packet is used to request the MAC address of the host 107. For example, the request packet, as shown in FIG. 1, may be an ARP packet in the IPv4 protocol, or may be an NDP packet in the IPv6. The second gateway obtains the MAC address corresponding to the first IP address according to a response of the host 107 to the request packet. If the second packet further carries the VNI of the first packet, when broadcasting the request packet, the second gateway determines, according to the VNI, a port broadcasting the request packet, and broadcasts the request packet to a host in the VXLAN segment corresponding to the VNI. If the second packet further carries the broadcast domain identifier in S202, when broadcasting the request packet, the second gateway determines, according to both the VNI and the broadcast domain identifier, a port broadcasting the request packet, and broadcasts the request packet to a host that is in the VXLAN segment corresponding to the VNI and that belongs to the broadcast domain.

S302: The second gateway sends a third packet to the first gateway, where the third packet is used to instruct a host identified by the first IP address to access the network by using the second gateway.

For example, the third packet may be a BGP packet. Specifically, the third packet may use a packet format the same as that of the second packet. For example, both of the packets are update packets in the BGP. A value field of a path attribute field carried in the third packet is the same as the value field in the second packet. A type field defines an identifier, to identify a type of the third packet.

S204: The first gateway receives the third packet from the second gateway, where the third packet is used to instruct the host identified by the first IP address to access the network by using the second gateway; and the first gateway writes an address of the second gateway into the forwarding table as a next hop address of the first IP address.

Specifically, the third packet carries a source address of a gateway sending the third packet, and the first gateway determines the second gateway according to the source address in the third packet.

For example, the first packet is a data packet, and the method further includes S205: The first gateway performs VXLAN encapsulation on the first packet to obtain an encapsulated first packet, and the first gateway sends the encapsulated first packet. A value of a VNI field in a VXLAN header of the encapsulated first packet is the VNI of the first packet; and a destination IP address of an outer IP header of the encapsulated first packet is the IP address of the second gateway.

For example, the first packet is a packet that is used by the host 106 to request, from the first gateway, the MAC address of the host identified by the first IP address, for example, an ARP packet or an NDP packet. The method further includes: sending, by the first gateway, a MAC address of the first gateway to the host 106.

Figure 3:
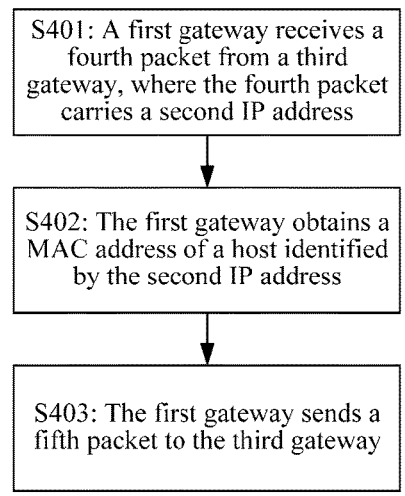
FIG. 3 is a flowchart of a method for obtaining a route according to a requirement according to an embodiment of this application.

Optionally, in response to a requirement of another gateway for determining whether a host identified by an IP address (for example, a second IP address) accesses the network by using the first gateway, the first gateway may also determine whether the host identified by the IP address accesses the network by using the first gateway. Steps for determining, by the first gateway, whether the host identified by the IP address accesses the network by using the first gateway are similar to those in S301 and S302 of determining, by the second gateway, whether the host identified by the first IP address accesses the network by using the first gateway. For example, if the first gateway receives a fourth packet that is from a third gateway and that is used to instruct the first gateway to determine whether the host identified by the second IP address accesses the network by using the first gateway, as shown in FIG. 3, the method further includes S401, S402, and S403.

S401: The first gateway receives a fourth packet from a third gateway, where the fourth packet carries a second IP address.

S402: The first gateway obtains a MAC address corresponding to the second IP address.

S403: The first gateway sends a fifth packet to the third gateway, where the fifth packet is used to instruct the third gateway to use an address of the first gateway as a next hop address of the second IP address.

In S401 and S402, a specific implementation of obtaining, by the first gateway according to the second IP address carried in the fourth packet, the MAC address corresponding to the second IP address may use the specific implementation of obtaining, by the second gateway according to the first IP address carried in the second packet, the MAC address corresponding to the first IP address in S301 shown in FIG. 2.

In S403, a specific implementation of sending the fifth packet by the first gateway to the third gateway may use the specific implementation of sending the third packet by the second gateway to the first gateway in S302 shown in FIG. 2.

Figure 4:
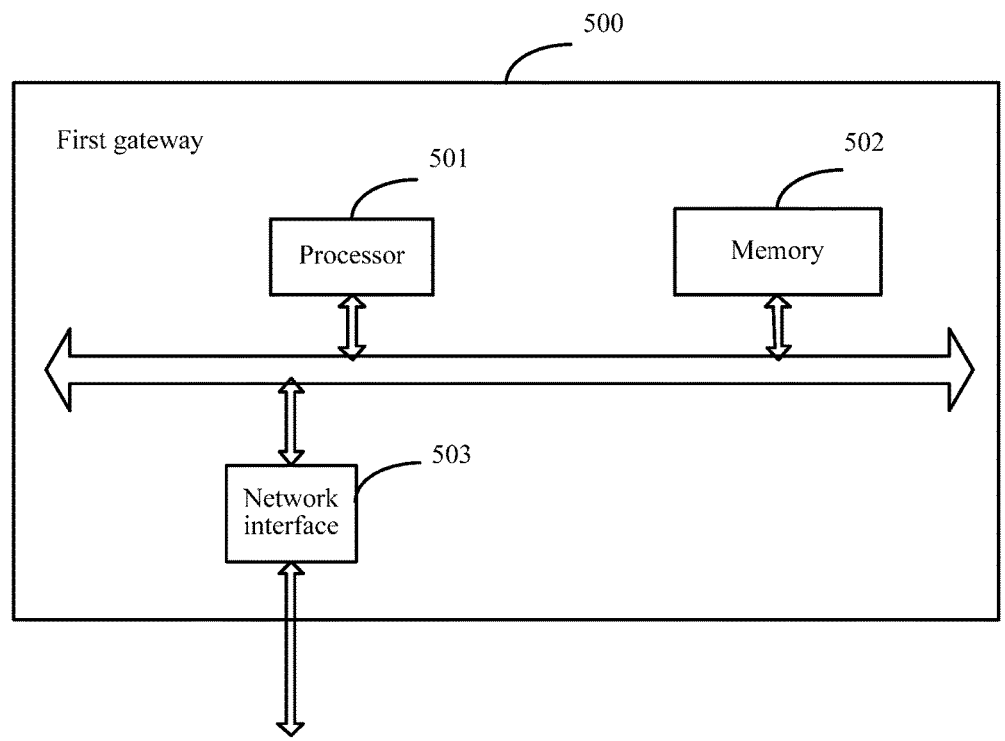
FIG. 4 is a schematic structural diagram of a first gateway according to an embodiment of this application.

FIG. 4 is a schematic structural diagram of a first gateway 500 according to an embodiment of this application. As shown in FIG. 4, the first gateway 500 includes a processor 501, a memory 502, and a network interface 503.

The memory 502 is configured to store a forwarding table. For example, the memory 502 includes, but is not limited to, a content-addressable memory (English: content-addressable memory, CAM for short), for example, a ternary content-addressable memory (English: ternary CAM, TCAM for short), and a random access memory (English: random-access memory, RAM for short).

The network interface 503 may be a wired interface, such as a fiber distributed data interface (English: Fiber Distributed Data Interface, FDDI for short), or an Ethernet (English: Ethernet) interface. Alternatively, the network interface 503 may be a wireless interface, for example, a wireless local area network interface.

The processor 501 includes, but is not limited to, one or more of a central processing unit (English: central processing unit, CPU for short), a network processor (English: network processor, NP for short), an application-specific integrated circuit (English: application-specific integrated circuit, ASIC for short), or a programmable logic device (English: programmable logic device, PLD for short). The PLD may be a complex programmable logic device (English: complex programmable logic device, CPLD for short), a field-programmable gate array (English: field-programmable gate array, FPGA for short), a generic array logic (English: generic array logic, GAL for short), or any combination thereof.

The memory 502 may also be integrated in the processor 501. If the memory 502 and the processor 501 are mutually independent devices, the memory 502 is in communication with the processor 501. For example, the memory 502 may communicate with the processor 501 by using a bus. The network interface 503 may communicate with the processor 501 by using the bus, or the network interface 503 may be directly connected to the processor 501. The processor 501 is configured to perform the following operations:

receiving a first packet by using the network interface 503, where the first packet includes a first Internet Protocol IP address;

searching the forwarding table stored in the memory 502 for a next hop of the first IP address, wherein the search fails;

sending a second packet to at least one gateway by using the network interface 503, where the second packet carries the first IP address, and the second packet is used to instruct a gateway receiving the second packet to determine whether a host identified by the first IP address accesses a network by using the gateway receiving the second packet;

receiving a third packet from a second gateway by using the network interface 503, where the second gateway is one of the at least one gateway, and the third packet is used to instruct the host identified by the first IP address to access the network by using the second gateway; and writing an address of the second gateway into the forwarding table stored in the memory as a next hop address of the first IP address.

For example, the processor 501 may include an NP and a CPU. The NP communicates with the CPU by using the bus. The NP is configured to perform a forwarding-plane operation, and the CPU is configured to perform a control-plane operation. Specifically, the NP receives the first packet by using the network interface 503, and searches the forwarding table stored in the memory 502 for the next hop of the IP address in the first packet. After the NP searches for the next hop of the IP address in the first packet, wherein the search fails, the NP sends the IP address to the CPU by using the bus. Specifically, when the NP searches for the next hop, one possible manner is that, if the memory is a RAM, the NP may read information about the forwarding table in the memory, and search for the next hop of the first IP address. Another possible manner is that, if the memory is a CAM, the NP sends the first IP address to the memory, and instructs the memory to search the forwarding table for an entry matching the first IP address, where the next hop of the first IP address is stored in the entry. The memory sends a result of the searching to the NP. Searching for the next hop, wherein the search fails, may mean that the NP does not find an entry matching the first IP address in the forwarding table. Searching for the next hop, wherein the search fails, may also mean that the memory sends a search failure result to the NP. For example, the forwarding table includes a general entry, and when the first IP address matches no entry in the forwarding table, the memory sends the general entry to the NP as the result of the searching. The CPU generates the second packet, and sends the second packet to the at least one gateway by using the network interface 503. Further, the CPU receives the third packet from the second gateway by using the network interface 503, and uses the address of the second gateway as the next hop address of the first IP address. The CPU sends the first IP address and the next hop address of the first IP address to the NP by using the bus. The NP writes the first IP address and the next hop address of the first IP address into the forwarding table stored in the memory 501.

Optionally, before searching the forwarding table stored in the memory 502 for the next hop of the IP address in the first packet, the processor 501 further performs the following steps: determining a port receiving the first packet; determining a virtual extensible local area network VXLAN network identifier VNI according to a mapping from the port to the VNI; and determining the forwarding table according to a mapping from the VNI to the forwarding table. For example, the steps may be performed by the NP. When sending the IP address to the CPU by using the bus, the NP further sends the VNI to the CPU.

Optionally, the second packet further carries the VNI. Optionally, before the processor 501 sends the second packet to the at least one gateway by using the network interface 503, the processor 501 further performs the following steps: searching a mapping table from multiple VNIs to multiple gateways for a gateway having the VNI; and determining the at least one gateway according to the result of the searching. For example, the steps may be performed by the CPU. The mapping table from the multiple VNIs to the multiple gateways may be stored in an internal memory of the CPU.

The first packet is a data packet, the first IP address is a destination IP address of the first packet, and the processor further performs the following steps: performing VXLAN encapsulation on the first packet, to obtain the third packet; and sending the third packet by using the network interface. A value of a VNI field in a VXLAN header of the third packet is the VNI, and a destination IP address of an outer IP header of the third packet is the IP address of the second gateway. For example, the steps may be performed by the NP.

Optionally, the first packet is an Address Resolution Protocol ARP packet, and the first IP address is a target IP address TPA of the first packet. Alternatively, the first packet is a Neighbor Discovery Protocol NDP packet, and the first IP address is a target address of the first packet.

Optionally, the processor 501 further performs the following steps: receiving a fourth packet from a third gateway by using the network interface 503, where the fourth packet carries a second IP address; obtaining a MAC address corresponding to the second IP address; and sending a fifth packet to the third gateway by using the network interface, where the fifth packet is used to instruct the third gateway to use an address of the first gateway as a next hop address of the second IP address. For example, the steps may be performed by the CPU.

Optionally, the fourth packet further carries a virtual extensible local area network VXLAN network identifier VNI. That the processor 501 obtains the MAC address corresponding to the second IP address specifically includes: obtaining, by the processor 501 in a VXLAN segment corresponding to the VNI, the MAC address corresponding to the second IP address. For example, the step may be performed by the CPU.

The first gateway 500 provided in this embodiment may be applied to the methods of the embodiments in FIG. 2 and FIG. 3, to implement functions of the first gateway. For other additional functions that may be implemented by the first gateway and an interaction process with another gateway, refer to the descriptions about the first gateway in the method embodiments, and details are not described herein again.

Figure 5:
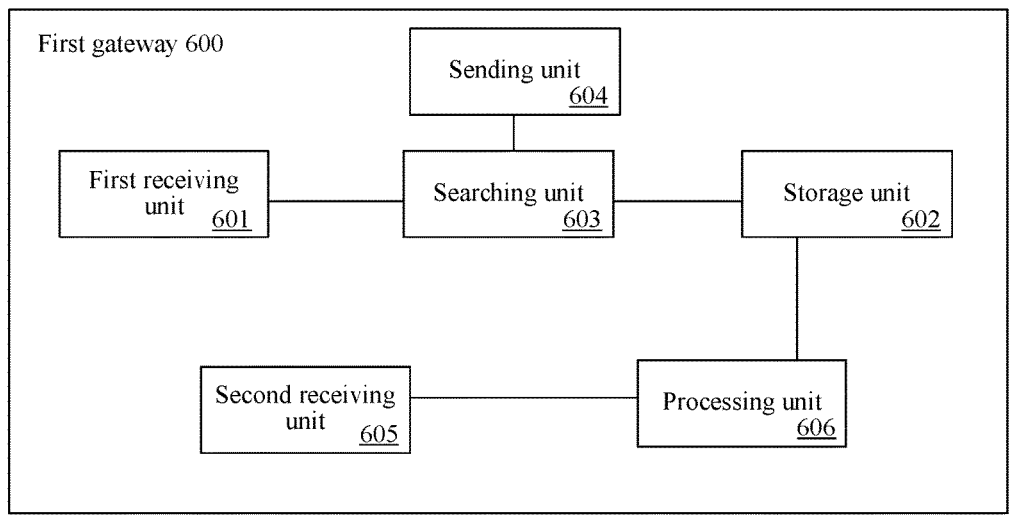
FIG. 5 is a schematic structural diagram of another first gateway according to an embodiment of this application.

FIG. 5 is a schematic structural diagram of another first gateway according to an embodiment of this application. As shown in FIG. 5, a first gateway 600 includes a first receiving unit 601, a storage unit 602, a searching unit 603, a sending unit 604, a second receiving unit 605, and a processing unit 606.

The first receiving unit 601 is configured to receive a first packet, where the first packet includes a first Internet Protocol IP address.

The storage unit 602 is configured to store a forwarding table.

The searching unit 603 is configured to: obtain the first packet received by the first receiving unit 601, and search the forwarding table stored in the storage unit 602 for a next hop of the first IP address, wherein the search fails.

The sending unit 604 is configured to: after the searching unit 603 searches for the next hop of the first IP address, wherein the search fails, send a second packet to at least one gateway, where the second packet carries the first IP address, and the second packet is used to instruct a gateway receiving the second packet to determine whether a host identified by the first IP address accesses a network by using the gateway receiving the second packet.

The second receiving unit 605 is configured to receive a third packet from a second gateway, where the second gateway is one of the at least one gateway, and the third packet is used to instruct the host identified by the first IP address to access the network by using the second gateway.

The processing unit is configured to: obtain the third packet received by the second receiving unit, and write, as a next hop address of the first IP address according to the third packet, an address of the second gateway into the forwarding table stored in the storage unit.

Optionally, the second packet further carries a first virtual extensible local area network VXLAN network identifier VNI of the first packet, and the searching unit 603 is further configured to determine the first VNI of the first packet before the sending unit sends the second packet to the at least one gateway.

Optionally, the first packet is an Address Resolution Protocol ARP packet, and the first IP address is a target IP address TPA of the first packet. Alternatively, the first packet is a Neighbor Discovery Protocol NDP packet, and the first IP address is a target address of the first packet.

Optionally, the second receiving unit 605 is further configured to receive a fourth packet from a third gateway, where the fourth packet carries a second IP address. The searching unit 603 is further configured to: obtain the fourth packet received by the second receiving unit 605, and determine that a MAC address of a host identified by the second IP address carried in the fourth packet can be obtained. The sending unit 604 is further configured to send a fifth packet to the third gateway, where the fifth packet is used to instruct the host identified by the second IP address to access the network by using the first gateway.

Optionally, the fourth packet further carries a second VNI. The searching unit 603 is configured to determine that the MAC address of the host identified by the second IP address can be obtained, and is specifically configured to attempt to obtain the MAC address of the host identified by the second IP address in a VXLAN segment identified by the second VNI.

The first gateway 600 shown in FIG. 5 and the first gateway 500 shown in FIG. 4 may be a same apparatus. For example, both are the first gateway in the methods shown in FIG. 2 and FIG. 3. It may be considered that, FIG. 4 shows content included in the first gateway physically, and FIG. 5 shows content included in the first gateway logically. Optionally, the first receiving unit 601, the second receiving unit 602, and the sending unit 604 that are shown in FIG. 5 may be implemented by using the network interface 503 shown in FIG. 4. The searching unit 603 and the processing unit 606 that are shown in FIG. 5 may be implemented by using the processor 501 shown in FIG. 4. The storage unit 602 shown in FIG. 5 may be implemented by using the memory 502 shown in FIG. 4.

The embodiments in this specification are all described in a progressive manner, for same or similar parts in the embodiments, refer to these embodiments, and each embodiment focuses on a difference from other embodiments. Especially, a system embodiment is basically similar to a method embodiment, and therefore is described briefly; for related parts, refer to partial descriptions in the method embodiment.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method for obtaining a route according to a requirement, comprising:
    receiving, by a first gateway, a first packet comprising a first Internet Protocol (IP) address;
    searching, by the first gateway, a forwarding table for a next hop of the first IP address, wherein the searching fails;
    sending, by the first gateway, a second packet to a second gateway to which a host identified by a virtual extensible local area network (VXLAN) network identifier (VNI) is allowed to connect in a local area network, wherein the second packet carries the first IP address, and the second packet is used to instruct a gateway receiving the second packet to determine whether a host identified by the first IP address accesses a network by using the gateway receiving the second packet;
    receiving, by the first gateway, a third packet from the second gateway, and the third packet is used to instruct the host identified by the first IP address to access the network by using the second gateway; and
    writing, by the first gateway, an address of the second gateway into the forwarding table as a next hop address of the first IP address.

2. The method according to claim 1, wherein the second packet further carries a first VNI of the first packet; and
    before the sending, by the first gateway, a second packet to a second gateway to which a host identified by a virtual extensible local area network (VXLAN) network identifier (VNI) is allowed to connect in a local area network, the method further comprises:
    determining, by the first gateway, the first VNI of the first packet.

3. The method according to claim 1, wherein the first packet is an Address Resolution Protocol (ARP) packet, and the first IP address is a target IP address of the first packet; or
    the first packet is a Neighbor Discovery Protocol (NDP) packet, and the first IP address is a target address of the first packet.

4. The method according to claim 1, comprising:
    receiving, by the first gateway, a fourth packet from a third gateway, wherein the fourth packet carries a second IP address;
    determining, by the first gateway, that a Media Access Control (MAC) address of a host identified by the second IP address can be obtained; and
    sending, by the first gateway, a fifth packet to the third gateway, wherein the fifth packet is used to instruct the host identified by the second IP address to access the network by using the first gateway.

5. The method according to claim 4, wherein the fourth packet further carries a second VNI, and the determining, by the first gateway, that a MAC address of a host identified by the second IP address can be obtained comprises:
    attempting, by the first gateway, to obtain the MAC address of the host identified by the second IP address in a VXLAN segment identified by the second VNI.

6. A network device, comprising:
    a processor;
    a memory; and
    a network interface, wherein the memory is configured to store a forwarding table, and the processor is configured to:
    receive a first packet by using the network interface, wherein the first packet comprises a first Internet Protocol (IP) address;
    search the forwarding table stored in the memory for a next hop of the first IP address, wherein the searching fails;
    send a second packet to a first gateway to which a host identified by a virtual extensible local area network (VXLAN) network identifier (VNI) is allowed to connect in a local area network by using the network interface, wherein the second packet carries the first IP address, and the second packet is used to instruct a gateway receiving the second packet to determine whether a host identified by the first IP address accesses a network by using the gateway receiving the second packet;
    receive a third packet from the first gateway by using the network interface, and the third packet is used to instruct the host identified by the first IP address to access the network by using the first gateway; and
    write an address of the first gateway into the forwarding table stored in the memory as a next hop address of the first IP address.

7. The network device according to claim 6, wherein the second packet further carries a first VNI of the first packet, and the processor is further configured to determine the first VNI of the first packet before sending the second packet to the first gateway to which the host identified by the VNI is allowed to connect in the local area network.

8. The network device according to claim 6, wherein the first packet is an Address Resolution Protocol (ARP) packet, and the first IP address is a target IP address (TPA) of the first packet; or
    the first packet is a Neighbor Discovery Protocol (NDP) packet, and the first IP address is a target address of the first packet.

9. The network device according to claim 6, wherein the processor is further configured to:
  receive a fourth packet from a second gateway by using the network interface, wherein the fourth packet carries a second IP address;
  determine that a Media Access Control (MAC) address of a host identified by the second IP address can be obtained; and
  send a fifth packet to the second gateway by using the network interface, wherein the fifth packet is used to instruct the host identified by the second IP address to access the network by using the network device.

10. The network device according to claim 9, wherein the fourth packet further carries a second VNI, and the determining that a MAC address of a host identified by the second IP address can be obtained comprises:
  attempting to obtain the MAC address of the host identified by the second IP address in a VXLAN segment identified by the second VNI.

11. A non-transitory computer readable medium storing program code thereon executed by a processor for obtaining a route, the program code comprising instructions for executing a method that comprises:
  receiving a first packet comprising a first Internet Protocol (IP) address;
  storing a forwarding table;
  searching the forwarding table stored in the non-transitory computer readable medium for a next hop of the first IP address;
  after the searching the forwarding table stored in the non-transitory computer readable medium for the next hop of the first IP address, wherein the searching fails, sending a second packet to a second gateway to which a host identified by a virtual extensible local area network (VXLAN) network identifier (VNI) is allowed to connect in a local area network, wherein the second packet carries the first IP address, and the second packet is used to instruct a gateway receiving the second packet to determine whether a host identified by the first IP address accesses a network by using the gateway receiving the second packet;
  receiving a third packet from the second gateway, and the third packet is used to instruct the host identified by the first IP address to access the network by using the second gateway; and
  obtaining the third packet and writing, as a next hop address of the first IP address according to the third packet, an address of the second gateway into the forwarding table stored in the non-transitory computer readable medium.

12. The non-transitory computer readable medium according to claim 11, wherein the second packet further carries a first VNI of the first packet, and further comprising:
  determining the first VNI of the first packet before sending the second packet to the second gateway to which the host identified by the VNI is allowed to connect in the local area network.

13. The non-transitory computer readable medium according to claim 11, wherein the first packet is an Address Resolution Protocol (ARP) packet, and the first IP address is a target IP address (TPA) of the first packet; or
  the first packet is a Neighbor Discovery Protocol (NDP) packet, and the first IP address is a target address of the first packet.

14. The non-transitory computer readable medium according to claim 11, further comprising:
  receiving a fourth packet from a third gateway, wherein the fourth packet carries a second IP address;
  obtaining the fourth packet, and determining that a Media Access Control (MAC) address of a host identified by the second IP address carried in the fourth packet can be obtained; and
  sending a fifth packet to the third gateway, wherein the fifth packet is used to instruct the host identified by the second IP address to access the network by using the first gateway.

15. The non-transitory computer readable medium according to claim 14, wherein the fourth packet further carries a second VNI, and further comprising: attempting to obtain the MAC address of the host identified by the second IP address in a VXLAN segment identified by the second VNI.

* * * * *